United States Patent [19]

Kersting

[11] Patent Number: 4,735,720

[45] Date of Patent: Apr. 5, 1988

[54] PLEATED FILTER ELEMENT HAVING IMPROVED SIDE SEAM SEAL

[75] Inventor: Darrel Kersting, Black River Falls, Wis.

[73] Assignee: Nelson Industries Inc., Stoughton, Wis.

[21] Appl. No.: 839,946

[22] Filed: Mar. 17, 1986

[51] Int. Cl.$^4$ .............................................. C01D 27/06
[52] U.S. Cl. ............................ 210/493.5; 210/497.01; 55/498; 55/500; 55/502; 55/521
[58] Field of Search ... 210/493.1, 493.2, 497.01.493.5, 210/433.1; 55/498, 500, 502, 521, DIG. 5; 264/48 D, 275; 156/218

[56] References Cited

U.S. PATENT DOCUMENTS

| | | | |
|---|---|---|---|
| 3,407,252 | 10/1968 | Pall et al. | 264/131 |
| 3,865,919 | 2/1975 | Pall et al. | 264/48 D |
| 3,867,294 | 2/1975 | Pall et al. | 210/489 |
| 4,154,688 | 5/1979 | Pall | 55/498 |
| 4,184,966 | 1/1980 | Pall | 210/493 |
| 4,392,958 | 7/1983 | Ganzi et al. | 210/493.2 |
| 4,419,241 | 12/1983 | Hoffman | 210/493.5 |
| 4,512,892 | 4/1985 | Ganzi et al. | 210/493.2 |
| 4,588,464 | 5/1986 | Miyagi et al. | 210/493.2 |

Primary Examiner—Richard V. Fisher
Assistant Examiner—Wanda L. Millard
Attorney, Agent, or Firm—Andrus, Sceales, Starke & Sawall

[57] ABSTRACT

A pleated filter element comprising a sheet of filter material disposed in generally cylindrical configuration and having a series of longitudinally extending pleats. The pleats have outer radial extremities that lie on an outer circle and inner radial extremities that lie on an inner circle. The end pleats in the series terminate in side edges which are disposed in contiguous relation. A mass or bar of synthetic resin connects and encapsulates the side edges, and the connected end pleats have the same radial depth as the remaining pleats in the filter.

4 Claims, 1 Drawing Sheet

PLEATED FILTER ELEMENT HAVING IMPROVED SIDE SEAM SEAL

BACKGROUND OF THE INVENTION

A pleated filter element comprises a sheet of filter material folded to form a plurality of parallel pleats or folds. The side edges of the sheet are brought together to provide a cylindrical configuration and the side edges are then joined together. In the conventional method of joining the side edges, one or both of the opposed side edges is coated with an adhesive and a sealed joint is then formed by application of heat to set the adhesive.

Difficulties have arisen in providing a positive seal between the side edges of the filter sheet, and in the past the seals have tended to be unreliable thereby permitting passage of solids through the filter element by edgewise flow through the side seam of the filter.

In the past a number of proposals have been made to increase the efficiency of the side seam seal. In U.S. Pat. No. 3,407,252 a heat sealable plastic tape is positioned between the side edges of the filter element and the tape bonds the ends through the application of heat and pressure.

In U.S. Pat. No. 3,867,294, the free side edges are provided with a reverse fold leaving a space in the form of a channel at the outer edge. A tape or ribbon of heat sealable adhesive is positioned within the channel, and when melted, provides a seam.

U.S. Pat. No. 4,184,966 discloses a seam sealing construction using a polypropylene channel-shaped strip to join the free side edges of the element, while U.S. Pat. No. 4,419,241 shows a flexible connecting strip inserted within the layers of the free side edges to provide a connection.

The seam sealing constructions for pleated filter elements, as used in the past, have been relatively expensive and in most cases the connected side edges did not have the same radial depth as the remaining pleats in the element. As a consequence, during service, movement or flutter of the connected side edges will occur because of pressure variations, particularly when the medium being filtered is cold and viscous, thereby resulting in tearing and failure of the filter element in this area.

SUMMARY OF THE INVENTION

The invention is directed to a pleated filter element having an improved side seam seal. In accordance with the invention, the free side edges of the tubular pleated filter element are brought together into contacting relation and inserted within the open ended cavity of an elongated U-shaped mold. The mold includes a pair of generally parallel side walls connected by a rounded bottom, and the contacting side edges of the element are spaced from the bottom of the mold.

A synthetic resin is introduced into the mold and serves to encapsulate the side edges. On solidification of the resin, a sealed connecting joint is provided which has the same radial depth as the pleats. This eliminates movement or flutter of the connected joint during service and thus reduces the possibility of tearing and failure of the element in this area.

As the side edges of the filter element are completely encapsulated in the synthetic resin, a more positive bond is achieved between the side edges, eliminating possible leakage through the joined seam.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
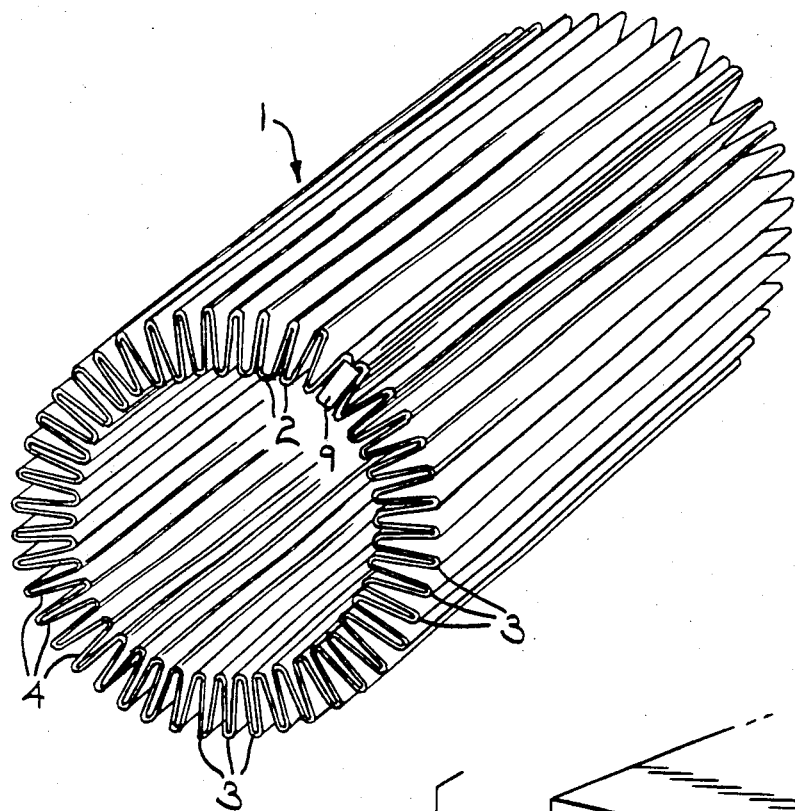
FIG. 1 is a perspective view of a pleated filter element incorporating the invention.

FIG. 1 shows a pleated cylindrical filter element 1 which can be employed to filter oil or other types of fluids. The ends of the filter are normally enclosed by end caps, not shown, and the medium to be filtered flows radially through the filter element, the flow in some cases being outside-in, while in other cases it may be inside-out.

The filter 1 is formed of one or more sheets of conventional, non-woven, fibrous filter sheet material. When using multiple sheets in the filter element, the sheets can be of the same porosity, but it is generally perffered that the upstream filter sheet be coarser than the downstream filter sheet. The porosity of the filter sheets can vary, depending upon the particular type of medium being filtered.

Filter element 1 is provided with a plurality of inner longitudinal folds 2, which lie on inner circle A and a plurality of outer folds 3 which lie on an outer circle B. Folds 2 and 3 define a multiplicity of longitudinal pleats 4.

Figure 3:
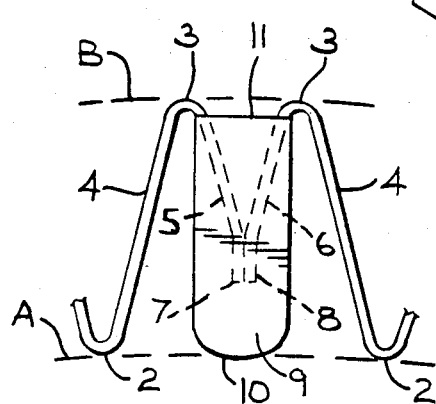
FIG. 3 is an enlarged fragmentary end view of the filter showing the side seam seal.

End pleats 5 and 6, located at the sides of the filter sheet terminate in side edges 7 and 8, respectively. As best illustrated in FIG. 3, the side edges or extremities 7 and 8 are disposed in contacting relation and end pleats 5 and 6 diverge outwardly from each other.

Encapsulating end pleats 5 and 6 is a mass or bar of a synthetic resin 9. As shown in FIG. 3, the inner end or extremity 10 of bar 9 lies on the inner circle A, while the outer end 11 of the bar 9 is spaced inwardly from the outer circle B. The resin 9 completely encapsulates the end pleats 5 and 6, being located between the diverging end pleats as well as surrounding the pleats and the side edges 7 and 8.

The resin bonding material may take the form of a thermoplastic resin, such as polyvinyl chloride, polyvinylidene chloride, polyacrylonitrile, polyethelene, polypropylene, rubber or the like. In addition, the bonding material may be a thermosetting resin, such as a polyester, polyepoxide or phenolformaldehyde resin.

Figure 2:
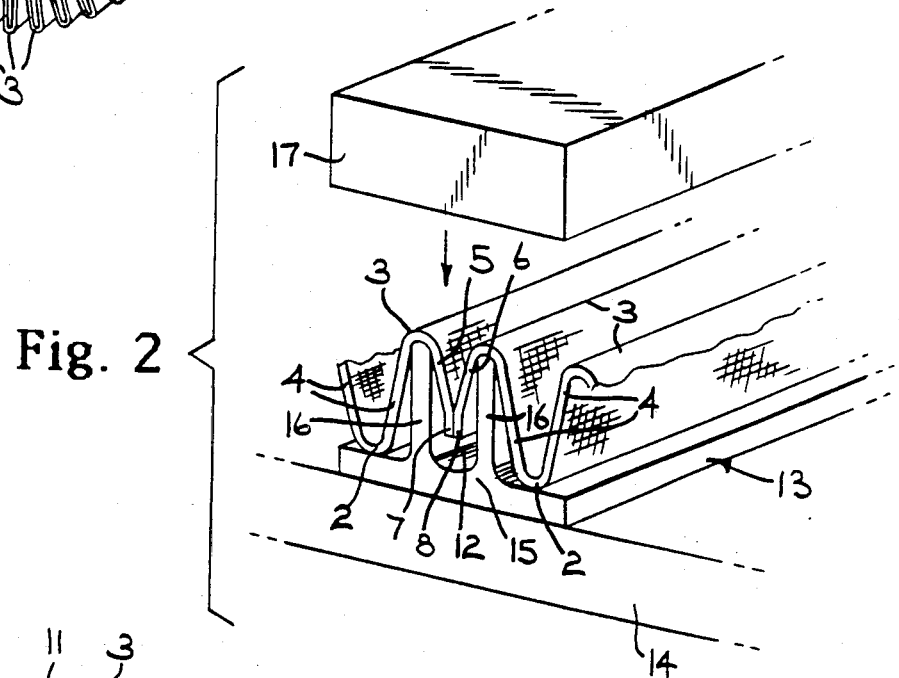
FIG. 2 is a perspective view showing the manner of producing the joined side edge seam.

The manner of forming the side seam joint is best illustrated in FIG. 2. End pleats 5 and 6 are inserted within the cavity 12 of a mold 13 that is supported on a table or supporting surface 14. Mold 13 includes a base 15, and a pair of spaced side walls 16 which extend outwardly from the base. Base 15 and side walls 16 define the cavity 12. As shown in FIG. 2, the outer folds 3 bordering end pleats 5 and 6 are supported on the outer extremities of side walls 16, while the side edges 7 and 8 are spaced from the bottom 15 of the mold. Mold 13 extends the complete length of the filter element 1.

A liquid synthetic resin is introduced into the mold cavity and suitable end members, not shown, are positioned at the ends of the mold to prevent the resin from flowing from the ends of the cavity 11. Clamp 17 is then moved downwardly to clamp the outer folds 13 against the outer edges of side walls 16.

On solidification of the resin, the resulting joint or seam is illustrated in FIG. 3. As the end pleats 5 and 6 are completely encapsulated in the resin material 9, a more positive seal is provided which will eliminate any possible leakage through the sealed side seam. Further, the sealed joint is provided with the same radial depth as the pleats 4 and this will eliminate fluttering of the sealed joint during service because of pressure variations. As movement or flutter is eliminated, the possibility of tearing of the filter element in this location is minimized.

While the drawings show the extremity 10 of the resin bars 9 being located along the inner circle A, it is contemplated that the edges 7 and 8 can also face outwardly so that the extremity 10 of resin bar 9 will lie on the outer circle B. In either case, the sealed joint has the same radial depth as the pleats 4.

Various modes of carrying out the invention are contemplated as being within the scope of the following claims particulary pointing out and distinctly claiming the subject matter which is regarded as the invention.

I claim:

1. A pleated filter element, comprising a sheet of filter material disposed in generally cylindrical configuration and having a plurality of longitudinally extending pleats, said pleats having outer radial extremities lying on an outer circle and having inner radial extremities lying on an inner circle, pleats at the ends of said sheet diverging to provide a space therebetween and terminating in side edges disposed in contiguous relation, said contiguous side edges being located between said inner and outer circles and said contiguous edges facing a first of said circles, said sheet also including a pair of second pleats each connected to a corresponding end pleat and disposed at an acute angle to said corresponding end pleat, and a mass of a bonding material connected to and substantially encapsulating said end pleats and spaced out of contact with said second pleats, said mass disposed within said space and having a radial extremity disposed on said first circle.

2. The filter element of claim 1, wherein said bonding material is a thermoplastic resin.

3. A pleated filter element comprising, a sheet of filter material disposed in generally circular configuration and having a plurality of longitudinally extendinq pleats, said pleats having outer radial extremities lying on an outer circle and having inner radial extremities lying on an inner circle, pleats at the ends of said sheet terminating in side edges disposed in contiguous relation, said contiguous side edges being located between said inner and outer circles and said contiguous edges facing a first of said circles, said sheet also including a pair of second pleats each connected to a corresponding end pleat and disposed at an acute angle to said corresponding end pleat, and a mass of a synthetic resin connected to and substantially encapsulating said end pleats and spaced out of contact with said second pleats, said mass having a first radial extremity disposed on said first circle and having a second radial extremity disposed adjacent a second of said circles.

4. The filter element of claim 3, wherein said contiguous edges face toward said inner circle.

* * * * *